United States Patent [19]

Engemann et al.

[11] Patent Number: 4,544,842

[45] Date of Patent: Oct. 1, 1985

[54] DOCUMENT SCANNING APPARATUS COMPRISING A LIGHT CONDUCTOR BLOCK

[75] Inventors: Detlef Engemann, Oberursel; Dieter Fischer, Frankfurt; Karl-Heinz Vatterott, Duderstadt, all of Fed. Rep. of Germany

[73] Assignee: Triumph-Adler Aktiengesellschaft fur Buro- und Informationstechnik, Nuremberg, Fed. Rep. of Germany

[21] Appl. No.: 478,623

[22] Filed: Mar. 23, 1983

[30] Foreign Application Priority Data

Mar. 24, 1982 [DE] Fed. Rep. of Germany ....... 3211380

[51] Int. Cl.⁴ .............................................. G02B 5/14
[52] U.S. Cl. ................... 250/227; 350/96.25
[58] Field of Search ...... 250/227, 557, 571; 355/1; 358/213, 293; 350/96.25, 96.27

[56] References Cited

U.S. PATENT DOCUMENTS

| 3,950,074 | 4/1976 | Tanaka | 350/96.25 |
| 4,168,900 | 9/1979 | Adachi | 355/1 |
| 4,427,881 | 1/1984 | Ruell | 250/231 |
| 4,432,022 | 2/1984 | Tokumitsu | 358/293 |

Primary Examiner—David C. Nelms
Assistant Examiner—James Gatto
Attorney, Agent, or Firm—Joseph R. Spalla

[57] ABSTRACT

An arrangement of light wave conductors are correlated with the sensor areas of an image sensor array. The individual light wave conductors consist of glass wafers or glass fibers whose width or diameter each corresponds to the width of a sensor area. The light wave conductors are joined to form a block whose top surface area corresponds to the area of a document to be scanned line by line.

5 Claims, 3 Drawing Figures

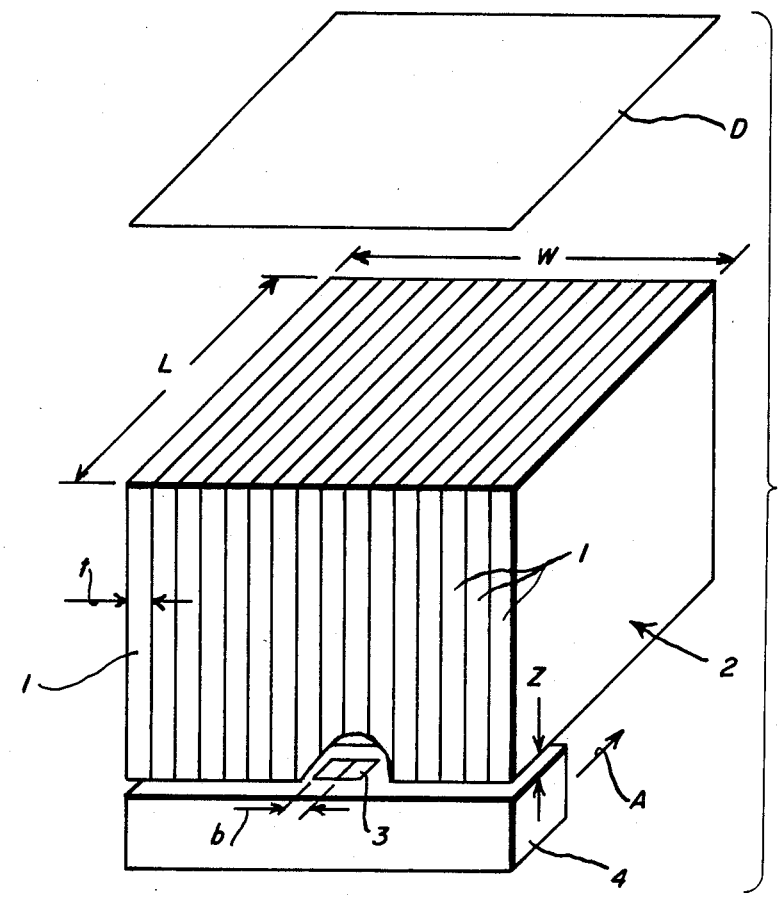
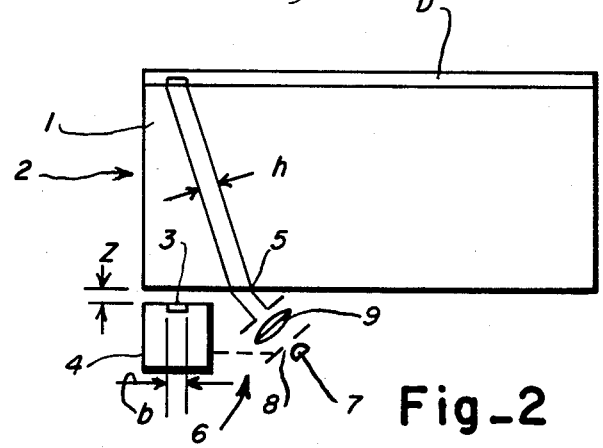
Fig_1
Fig_2
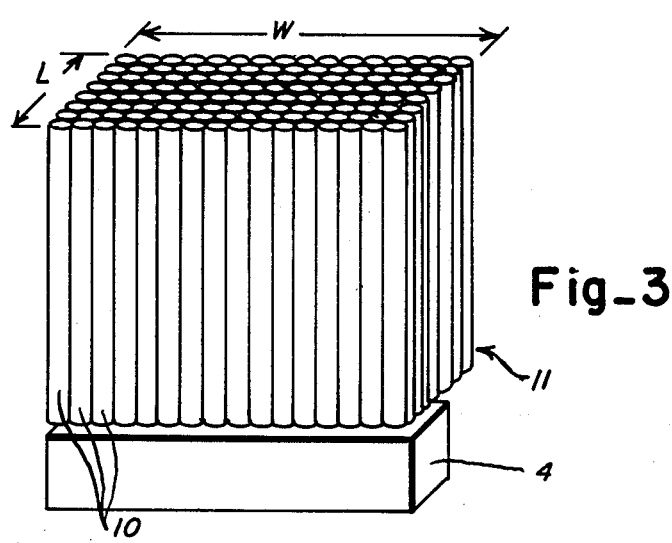
Fig_3

DOCUMENT SCANNING APPARATUS COMPRISING A LIGHT CONDUCTOR BLOCK

This invention relates to a reproduction system for a linear image sensor array which scans an original line by line; more particularly it relates to a system having a plurality of light wave conductors correlated with individual sensor areas in a line array of sensors.

Copending application related to this application are Engemann et al application, Ser. No. 442,017 filed Nov. 16, 1982 and Fischer et al application Ser. No. 271,620 filed June 8, 1981 now U.S Pat. No. 4,430,564 issued Feb. 7, 1984.

To scan a document with a linear image sensor array, either a costly optical system is required or the distance between the image sensor array and the document must be smaller than the width of a sensor area to assure that the original will be reproduced with an adequate contrast ratio.

One solution to the problem of attaining unequivocal correlation between a document image area in an object plane and a sensor area in an image plane is disclosed in said copending U.S. application of Engemann, et al wherein glass spacers with interposed diaphragms are provided between document or object plane and image plane to limit light incident on a light sensor in the array to that reflected from an opposite area in the object plane. In this system the document is in direct contact with the surface of the glass spacers as it is moved relative to the linear image sensor array. This may cause abrasion and wear of the upper glass layer of the spacer by the document to be scanned.

In accordance with a preferred embodiment of the invention this problem is solved in the provision of individual light wave conductors comprising glass wafers whose thickness corresponds to the width of an image sensor area, and by joining, as by laminating, the wafers to form a block, with total reflection occurring at the boundary surfaces of the glass wafers, and whose top surface area corresponds to the area of the document. The glass wafers are preferably mirrored on one side.

According to an alternative embodiment, the individual light wave conductors may comprise glass fibers whose diameter corresponds to the width of an image sensor area in the array, with the glass fibers joined to form a tightly packed block whose top surface area corresponds to the area of the document to be scanned.

Further according to the invention the spacing between the underside of the light wave conductor block and the movable image sensor array is twice the width of a sensor area so that the image sensor array can be shifted relative to the plate to line scan a document placed on the upper or top surface of the block. Also provided is a light source for exposing a strip of a document whose dimensions are the same as the dimensions of the line of image sensors in the sensor array.

The advantages attained by the invention reside in the fact that a stationary document rests on a solid glass block, namely the laminate constituted of individual glass wafers or of a bunch of light conductor fibers. The image sensor array is moved along the lower polished glass surface of the block. A narrow gap is provided between the lower glass surface of the light conductor block and the image sensor array to preclude wear phenomena on the glass surface. Because of the light conductor effect of the individual glass wafers or glass fibers, the distance between the upper surface bearing the original and lower surface of the glass plate, i.e. the height of the block, is not critical.

An object of the invention is to obtain an unequivocal point-to-point reproduction of a document by sensors of an array of image sensors without the need for moving contact between document and glass spacers between the original and image sensor array.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

FIG. 1 is a perspective view of an arrangement showing light conducting glass wafers for achieving unequivocal correlation of points on a document in an object plane and image sensor areas of an image sensor array.

FIG. 2 is a side elevational view showing a light source for strip exposure of a document associated with the image sensor array; and FIG. 3 is a perspective view similar to FIG. 1 of an arrangement utilizing light conducting fibers.

Referring now to FIG. 1 there is shown an arrangement in accordance with the invention which comprises a plurality of glass wafers 1 glued face to face to one another to form a block generally designated by reference numeral 2 whose length L and width W corresponds to a document D to be scanned line by line. The thickness t of individual glass wafers 1 equals the width b of an image sensor 3 in a line array 4 of image sensors extending across the width W of the block.

Details of the image sensor array 4 are disclosed in said copending Fischer et al application which is incorporated by reference herein and to which reference may be made.

To obtain the light conductor effect, the wafers are joined by an adhesive whose index of refraction is clearly smaller than that of glass, or they are provided on one face with a reflecting layer such as aluminum. This lamminated block 2 of wafers 1 is located between a document D to be scanned and an image sensor array 4 so that the wafers 1 are perpendicular to the line array 4 of sensors 3. The document to be scanned is placed in direct contact with the upper surface of the block and is strip or line scanned by moving the image sensor array 4 parallel to the undersurface of the block 2 in the direction of its length L. The sensor array 4 is spaced a distance z below the block, the distance z being about twice the width b of a sensor 3.

The light reflected by a point of a document D placed with its message face down on the block 2 spreads within the wafers 1 of the block due to the total reflection at the boundary surface. Due to refraction, under a minimum angle of under 42°, there is a reduction of the brightness of an image point at the opposite sensor 3. However the image resolution with respect to the individual lines is determined by the height of the exposure light beam which determines the height of the line read. The document D is therefore exposed with a slit or strip of light 5 whose height h corresponds to the height in the direction L of a document image point and a sensor 3. This is accomplished, for instance, by an exposure assembly generally designated by reference 6 having a line light source 7 for exposing the document D on the object plane through slits 8 of appropriate width positioned on either side of a cylindrical lens 9. This exposure assembly 6 is connected rigidly to the image sensor array 4, and so positioned that as it moves in arrow direction A with the sensor array 4 underneath the block 2, a strip of the document of height h always exactly above the line array 4 of image sensors is exposed.

According to FIG. 3, individual glass fiber light conductors 10 of a diameter of the size of a sensor 3 are vertically joined together to form a tightly packed block 11. Also, the top surface of the block defined by the ends of the glass fibers 10 corresponds to the size of a document D. The block 11 may be produced, for instance, by fusing the individual fibers 10 together in a manner known per se.

It is to be understood that the numbers of wafers 1 or fibers 10 comprising the blocks 2 and 11 are illustrative only and that the actual numbers for scanning standard paper sizes are much greater to achieve dot resolutions on the order of, for example, 10 image points per millimeter.

The invention claimed is:

1. Document scanning appartus for supporting and scanning a stationary document comprising a stationary light conductor block having a top side whose length and width corresponds to that of a document for directly supporting said document thereon for scanning, said light conductor block comprising a plurality of joined light conductors oriented to transmit light in vertical planes, a line array of image sensors spaced from the underside of said light conductor block for movement along and parallel to the underside of said light conductor block in direction of the length of said light conductor block, each of said light conductors having a width corresponding to the width of an image sensor in said line array, and a light source movable together with said line array of image sensors and positioned to illuminate a strip of said supported document opposite said line array of image sensors and having a height corresponding to the length of image sensors in said line array.

2. Document scanning apparatus as recited in claim 1, said light conductors comprising glass wafers vertically joined face to face.

3. Document scanning apparatus as recited in claim 2, said glass wafers having mirrored faces.

4. Document scanning apparatus as recited in claim 2, said image sensor array being spaced from the underside of said block by a distance twice the width of an image sensor.

5. Document scanning apparatus as recited in claim 1, said light conductors comprising glass fibers.

* * * * *